US012459546B2

(12) United States Patent
Fujimoto (10) Patent No.: US 12,459,546 B2
(45) Date of Patent: Nov. 4, 2025

(54) RAIL-MOUNTED ROBOT INSPECTION SYSTEM

(71) Applicant: Yokogawa Electric Corporation, Tokyo (JP)

(72) Inventor: Naoyuki Fujimoto, Addison, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 777 days.

(21) Appl. No.: 17/700,103

(22) Filed: Mar. 21, 2022

(65) Prior Publication Data

US 2023/0294744 A1 Sep. 21, 2023

(51) Int. Cl.
*B61C 13/00* (2006.01)
*B60L 53/12* (2019.01)
*B61C 3/00* (2006.01)
*H01Q 13/20* (2006.01)
*H02J 7/00* (2006.01)
*H02J 50/20* (2016.01)
*G01M 99/00* (2011.01)

(52) U.S. Cl.
CPC ............. *B61C 13/00* (2013.01); *B60L 53/12* (2019.02); *B61C 3/00* (2013.01); *H01Q 13/203* (2013.01); *H02J 7/0042* (2013.01); *H02J 50/20* (2016.02); *B60L 2200/26* (2013.01); *G01M 99/00* (2013.01)

(58) Field of Classification Search
CPC . B61C 3/00; B61C 13/00; B60L 53/12; H02J 7/0042; H02J 50/20; H01Q 13/203; G01M 99/00
See application file for complete search history.

(56) References Cited

FOREIGN PATENT DOCUMENTS

| CN | 106608265 | 5/2017 | |
|---|---|---|---|
| CN | 112165134 | 1/2021 | |
| CN | 112788309 | 5/2021 | |
| CN | 13341697 | 6/2021 | |
| CN | 213341697 U | * 6/2021 | ............ H02J 7/0042 |
| JP | 01194702 | 8/1989 | |
| JP | 10105225 | 4/1998 | |
| JP | 2006234728 | 9/2006 | |
| JP | 2006331053 | 12/2006 | |
| JP | 2008546365 | 12/2008 | |
| JP | 2017068455 | 4/2017 | |

OTHER PUBLICATIONS

"OPR12 Explosion-proof track inspection robot" Beijing Topsky Intelligent Equipment Group Co., Ltd. 4 pages.

(Continued)

*Primary Examiner* — Robert J McCarry, Jr.
(74) *Attorney, Agent, or Firm* — Gray Ice Higdon (57) ABSTRACT

Implementations are described herein for operating rail-mounted robots in hazardous conditions. In various implementations, a rail-mounted robot configured to inspect a plant with an explosion proof area may include: an actuator to propel the rail-mounted robot along a rail; a battery to provide power to the actuator; a charger to draw power from a power terminal integral with the rail while the rail-mounted robot is in motion, and to charge the battery using the drawn power; and logic to localize the rail-mounted robot based on readings from location indicia distributed along the rail.

16 Claims, 5 Drawing Sheets

(56) References Cited

OTHER PUBLICATIONS

China National Intellectual Property Administration; First Office Action issued for Application No. 202310266963, 58 pages, dated May 9, 2025.
China National Intellectual Property Administration; Second Office Action issued for Application No. 202310266963. 12, pages, dated Sep. 18, 2025.

* cited by examiner

RAIL-MOUNTED ROBOT INSPECTION SYSTEM

BACKGROUND

Process automation plants such as chemical refineries or petrochemical plants are often large and complex, making tasks such as inspection of these plants cumbersome and/or expensive. One way to alleviate these challenges is to deploy robots. As an example, rail-mounted robots are often deployed in factories for various purposes. However, many process automation plants include areas that are hazardous, e.g., because of the presence of ignitable particulates, dust, gas, flyings, and/or chemicals. Some of these areas are referred to as "explosion proof" areas. Robots and/or rails that are not designed to operate safely in explosion-proof areas may create hazardous conditions. For example, an exposed power terminal may generate an arc, which could trigger an explosion or fire.

SUMMARY

Implementations are described herein for operating rail-mounted robots in hazardous conditions. More particularly, but not exclusively, implementations are described herein for rail-mounted robots and rails that can be deployed in explosion-proof areas. In various implementations, a rail-mounted robot may be powered by a battery. To limit the size of the battery, the rail-mounted robot may charge the battery while operating—and more particularly, while in motion—rather than charging the battery at a base charging station and then operating the rail-mounted robot to perform as many of its tasks as possible using the single charge.

In some implementations, a rail-mounted robot for inspecting a plant with an explosion proof area may include: an actuator to propel the rail-mounted robot along a rail; a battery to provide power to the actuator; a charger to draw power from a power terminal integral with the rail while the rail-mounted robot is in motion, and to charge the battery using the drawn power; and logic to localize the rail-mounted robot based on readings from location indicia distributed along the rail.

In various implementations, the rail-mounted robot may include one or more sensors and a transceiver to wirelessly transmit data obtained via one or more of the sensors to a remote computing device. In various implementations, the transceiver may be configured to exchange data wirelessly with a wireless antenna embedded in the rail. In various implementations, the wireless antenna may be a leak antenna.

In various implementations, the charger draws the power from an exposed conductive trace that extends along a length of the rail outside of the explosion-proof area. In various implementations, the charger takes the form of a conductive wheel or capacitive coupling pad that draws power from the exposed conductive trace.

In various implementations, the charger may take the form of a radio frequency (RF) power antenna, and the power terminal integral with the rail takes the form of a plurality of RF power transmitters distributed along a length of the rail. In various implementations, at least some of the readings used by the logic to localize the rail-mounted robot may be obtained intermittently from one or more of the plurality of RF power transmitters.

In various implementations, at least some of the location indicia take the form of radio frequency identification (RFID) tags, and the rail-mounted robot further includes an RFID reader that obtains at least some of the readings used by the logic to localize the rail-mounted robot from the RFID tags.

In various implementations, the actuator is configured to propel the rail-mounted robot at a first velocity over a first portion of the rail that includes the power terminal, and at a second velocity over a second portion of the rail that does not include the power terminal, and wherein the first velocity is less than the second velocity.

In another aspect, a system for inspecting a plant may include: a rail that passes through an explosion-proof area of the plant, wherein the rail comprises a plurality of wireless power transmitters enclosed within a portion of the rail that passes through the explosion-proof area; and a rail-mounted robot comprising: an actuator to propel the rail-mounted robot along the rail; one or more onboard sensors configured to generate one or more sensor signals that are usable to inspect the plant; a battery to provide power to the actuator; and a charger to charge the battery with power drawn from one or more of the wireless power transmitters while the rail-mounted robot is in motion.

In various implementations, one or more of the wireless power transmitters may take the form of an RF power transmitter, and the charger may take the form of an RF power antenna. In various implementations, the rail may include a plurality of location indicia distributed along the length of the rail, and the rail-mounted robot includes logic that is configured to localize the rail-mounted robot based on readings obtained from the location indicia. In various implementations, the plurality of indicia may include at least some of the plurality of wireless power transmitters. In various implementations, at least some of the readings used by the logic to localize the rail-mounted robot may be obtained intermittently from one or more of the plurality of wireless power transmitters. In various implementations, at least some of the location indicia take the form of RFID tags, and the rail-mounted robot may include an RFID reader that obtains at least some of the readings used by the logic to localize the rail-mounted robot from the RFID tags.

In various implementations, the actuator may be configured to propel the rail-mounted robot at a first velocity over a first portion of the rail that includes the plurality of wireless power transmitters, and at a second velocity over a second portion of the rail that does not include wireless power transmitters, and wherein the first velocity is less than the second velocity.

In various implementations, the rail further includes a leak antenna, and the rail-mounted robot is configured to transmit data generated from one or more of the onboard sensors to the leak antenna.

In another aspect, a method for operating a rail-mounted robot to inspect a plant may include: propelling the rail-mounted robot along a rail that passes through an explosion-proof area of the plant; while the rail-mounted robot is in motion being propelled through the explosion-proof area, wirelessly drawing power from a plurality of power terminals that are embedded within and distributed along a length of the rail; and inspecting the plant based on one or more sensor readings obtained from one or more sensors onboard the rail-mounted robot.

In various implementations, the method may further include transmitting data indicative of one or more of the sensor readings from the rail-mounted robot to a leak antenna embedded in the rail. In various implementations, the method may further include localizing the rail-mounted robot based on readings obtained from a plurality of location indicia distributed along a length of the rail.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for operating rail-mounted robots in hazardous conditions. More particularly, but not exclusively, implementations are described herein for rail-mounted robots and rails that can be deployed in explosion-proof areas. In various implementations, a rail-mounted robot may be powered by a battery. To limit the size of the battery, the rail-mounted robot may charge the battery while operating—and more particularly, while in motion—rather than charging the battery at a base charging station and then operating the rail-mounted robot to perform as many of its tasks as possible using the single charge.

Various measures may be implemented to facilitate safe charging of the robot's battery in and/or near explosion-proof areas. In some implementations, a plurality of wireless power transmitters, such as radio frequency (RF) power transmitters, may be distributed along a length of the rail, e.g., embedded and/or enclosed beneath a surface of the rail. The rail-mounted robot may include, as a charger, a corresponding RF antenna to draw power from these RF power transmitters. Because these RF power transmitters are not exposed to the exterior of the rail, they do not pose a risk of igniting flammable/explosive substances in explosion-proof areas, even while hot. Accordingly, the RF power transmitters can be distributed along portions of the rail that are both outside and inside of explosion-proof areas.

Additionally or alternatively, in some implementations, a conductive trace may be formed along exterior length(s) of the rail that are outside of explosion-proof area(s). The rail-mounted robot's charger may take the form of a conductive wheel, capacitive coupling pad, or other similar terminal that draws power from the conductive trace. Exposing the conductive trace inside of an explosion-proof area could present an explosion risk. Accordingly, the conductive trace may not be exposed on portion(s) of the rail that pass through explosion-proof area(s). Instead, the rail-mounted robot may either operate solely on battery power while in explosion-proof area(s), or may draw power from unexposed wireless power transmitters as described previously. In some such implementations, the charger of the rail-mounted robot may be retracted or otherwise rendered deactivated while the rail-mounted robot passes through explosion-proof area(s).

In some implementations where power terminals (wireless or conductive traces) are not evenly distributed along the rail, the rail-mounted robot may travel at different velocities depending on various factors. These factors may include, but are not limited to, power terminals currently available to the robot, the robot's current battery level, a distance to the next available power terminal(s), time constraints associated with task(s) assigned to the robot, and so forth. For example, a rail-mounted robot that is not at risk of violating any time constraints and/or has a battery with low power may travel more slowly over areas of the rail with densely-distributed wireless power transmitters or conductive traces, e.g., allowing it more time to charge its battery. By contrast, a robot with tight time-constraints and/or a relatively full battery may travel at a greater velocity through areas with available power terminal(s).

In some implementations, rail-mounted robots may be configured to localize themselves along the rail using location indicia that are distributed at selected locations on the rail. This may be more accurate than the rail-mounted robot relying on, for instance, an odometer and/or inertial measurement unit (IMU), wireless triangulation, or Global Positioning System (GPS) coordinates. These location indicia may take various forms, and may be configured for contactless reading. In some implementations, the location indicia may include RF identification (RFID) tags that can be read by an RFID reader onboard the rail-mounted robot. Near-field communication (NFC) tags may also be used. In other implementations, the location indicia may include visual indicia that can be detected using vision sensors such as digital cameras. Visual indicia may take various forms, such as bar codes, quick response (QR) codes, fonts that are readable by both humans and computers, such as E-13B or CMC-7 (sometimes referred to as magnetic ink character recognition, or "MICR"), and so forth. In yet other implementations, the RF power transmitters may also serve as location indicia by, for instance, modulating location data into the power they deliver to the rail-mounted robot.

In some implementations, rail-mounted robots may include sensors such as vision sensors, thermometers, infrared sensors, chemical sensors, gas sensors, etc., that may generate sensor signals that are usable to perform tasks such as inspecting a plant. For example, many process automation facilities include gauges that still need to be read visually. A rail-mounted robot may accomplish this using an onboard vision sensor to acquire vision data (e.g., digital photograph(s)) that captures the gauge. This vision data can then be analyzed, e.g., onboard the rail-mounted robot or remotely, to detect a reading of the gauge, e.g., using various image processing techniques.

However, obtaining data from the rail-mounted robot presents challenges. If the rail-mounted robot is required to upload sensor data via a physical connection, e.g., by way of a base station that also charges the robot, then the sensor data is only obtained whenever the rail-mounted robot comes to the base station to charge itself. Even if the rail-mounted robot is equipped to transmit data wirelessly, distributing wireless access points throughout a large and complex plant, with myriad metal components that may interfere with wireless signals, can be challenging. Accordingly, in various implementations, one or more wireless receivers or transceivers may be incorporated along the rail itself, so that the rail-mounted robot is never (or rarely) out of wireless range. In some such implementations, the wireless receiver may take the form of a leaky feeder, such as a coaxial leak antenna.

Figure 1:
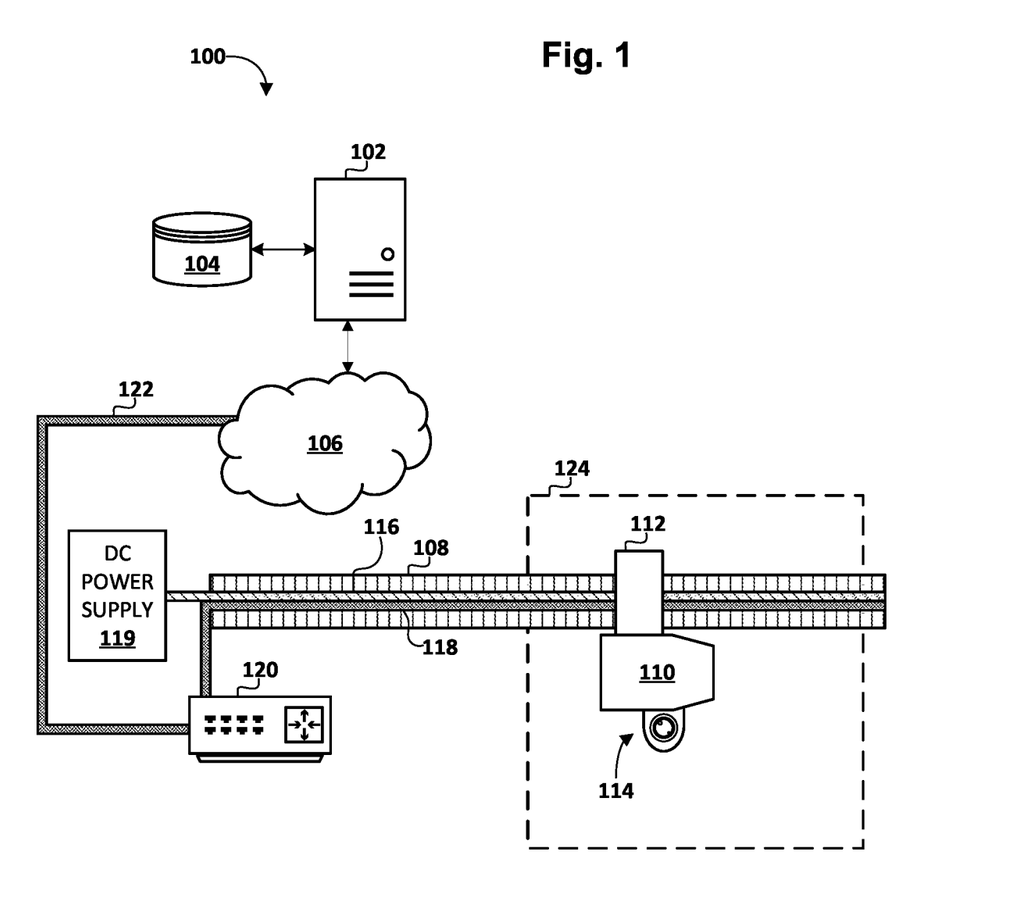
FIG. 1 schematically depicts an example environment in which selected aspects of the present disclosure may be implemented, in accordance with various embodiments.

Referring now to FIG. 1, an example environment 100 in which various aspects of the present disclosure may be implemented is depicted schematically. Environment 100 may take the form of, for instance, a process automation facility. A process automation facility may form all or part of a chemical processing plant, an oil or natural gas refinery, a catalyst factory, a manufacturing facility, etc. In this example, environment 100 includes one or more central servers 102 and one or more central databases 104. Server(s) 102 and database(s) 104 may be used to manage the facility and/or to store information about individual components within environment 100 (e.g., an inventory of inputs, outputs, distributed control nodes (DCNs)), processes being performed in the facility, personnel, etc. Server(s) 102 and database(s) 104 may be communicatively coupled with other components in environment 100 via one or more networks 106. Network(s) 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh).

The process automation facility may include any number of "points-of-interest" (POIs) that require periodic and/or occasional inspection. These POIs may include, but are not limited to, gauges, dials, interfaces between pipes (e.g., monitoring for escaping gas), valves, actuators, sensors, and so forth. Many POIs may be inspected by humans. However, human inspectors may be costly and/or prone to error, e.g., due to boredom, fatigue, etc. In addition, many plants and facilities include areas that are hazardous to humans. For example, "explosion-proof" (or "exproof") areas may include ignitable materials such as airborne chemicals and/or particulate that make inspecting these areas difficult and/or dangerous to human inspectors. While it may be possible to equip human inspectors to operate at least somewhat safely in these hazardous areas, e.g., with fireproof suits, doing so may be costly and may fail to completely eliminate the risks.

Accordingly, in various implementations, a rail-mounted robot 110 may be deployed, in addition to or in lieu of human inspectors, to inspect some or all of these POIs instead. Not only it rail-mounted robot 110 less prone to errors than humans, but rail-mounted robot 110 and a rail 108 on which rail-mounted robot 110 operates may be configured with selected aspects of the present disclosure to operate safely in hazardous areas, such as an explosion-proof area 124.

Rail-mounted robot 110 may include rail-mount hardware 112 that connects rail-mounted robot 110 to rail 108. Rail-mount hardware 112 may take various forms depending on attributes of rail 108. In some implementations, rail-mounted robot 110 may include a linear induction motor that propels rail-mounted robot 110 along rail 108. In other implementations, rail-mounted robot 110 and/or rail-mount hardware 112 may include an electric motor that rotates one or more wheels (not depicted) on rail-mount hardware 112, propelling rail-mounted robot 110 along rail 108. Other propulsion techniques are contemplated.

Rail-mounted robot 110 may be equipped with one or more sensors that are configured to detect a variety of different events. These sensors may take various forms, including vision sensors, barometers, thermometers, infrared sensors, chemical sensors, pressure wave sensors (e.g., microphones), moisture sensors, light detection and ranging (LIDAR) sensors, Geiger counters, gas ionization sensors, scintillation sensors, spectrometers, optical sensors, and so forth.

In FIG. 1, for instance, rail-mounted robot 110 is equipped with a vision sensor 114 that may be rotatable and/otherwise movable relative to rail-mounted robot 110. Image(s) captured by vision sensor 114 may be analyzed using various techniques to perform various inspection tasks, such a reading gauges, inspecting equipment, monitoring for chemicals, etc. As one example, images captured by vision sensor 114 may be analyzed using various image processing techniques, such as optical character recognition (OCR), object detection, machine-learning, etc., to identify and/or obtain readings from gauges. In some implementations in which machine learning is performed for these purposes, a neural network such as a convolutional neural network (CNN) may be trained using labeled training images to detect gauges and/or read data from gauges.

Rail-mounted robot 110 may include a battery (not depicted in FIG. 1, see FIGS. 2-3) that provides at least some of the power used to propel rail-mounted robot 110 along rail 108. In order to recharge this battery without requiring rail-mounted robot 110 to return to some set charging station, rail 108 may include a power line 116 that is electrically coupled with a power source, such as a DC power supply 119. As will be explained in more detail with regard to subsequent figures, power line 116 may be able to provide power to rail-mounted robot 110 at virtually any point along rail 108, even while rail-mounted robot 110 is moving along rail 108. In addition, power line 116 may be embedded within rail 108, leaving no exposed electrical terminals or contacts, so that rail-mounted robot 110 can charge its battery even as it travels through an explosion-proof area 124.

One challenge of deploying rail-mounted robot 110 in environment 100 is the exchange of data with rail-mounted robot 110. For example, sensor data acquired by rail-mounted robot 110 may need to be relayed to server(s) 102. Additionally, in some implementations, rail-mounted robot 110 may operate based on command(s) received from server(s) 102. In many cases, rail-mounted robot 110 may be equipped with a wireless transceiver to communicate with server(s) 102 via process automation network 106. However, environment 100 may be very large, with numerous equipment and other features (e.g., particulate) that may interfere with wireless transmissions. Deploying enough wireless access points to enable rail-mounted robot 110 to communicate with server(s) 102 at any point may be costly and/or cumbersome.

Accordingly, in various implementations, rail 108 may be equipped with a wireless transceiver 118 that runs along at least part of the length of rail and connects to networking equipment 120, such as a router or switch. Networking equipment 120 in turn may connect to process automation network 106 via an additional network connection 122. As a result, rail-mounted robot 110 may remain within wireless range of wireless transceiver 118 for much, if not all, of the length of rail 108. In some implementations, wireless transceiver 118 may take the form of a leaky feeder, also referred to as a "radiating cable." For example, wireless transceiver 118 may take the form of a coaxial leak antenna embedded within rail 108.

Figure 2A:
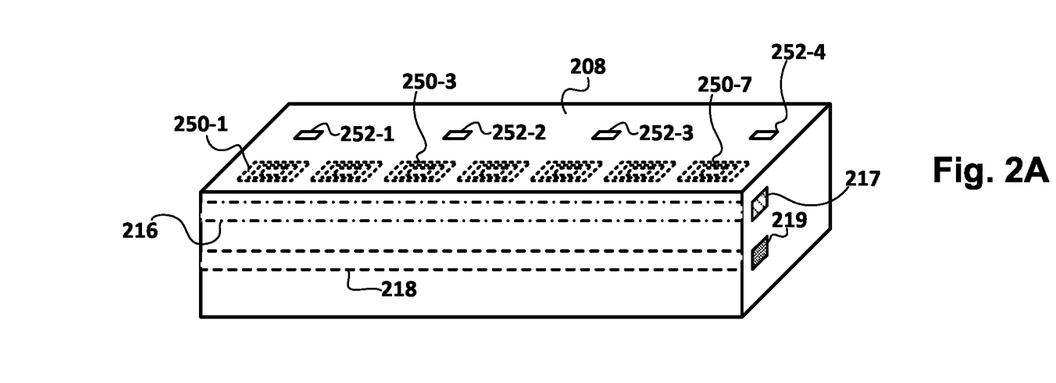
FIG. 2A and FIG. 2B schematically depict an example of a rail-mounted robot and rail, in accordance with various embodiments.
Figure 2B:
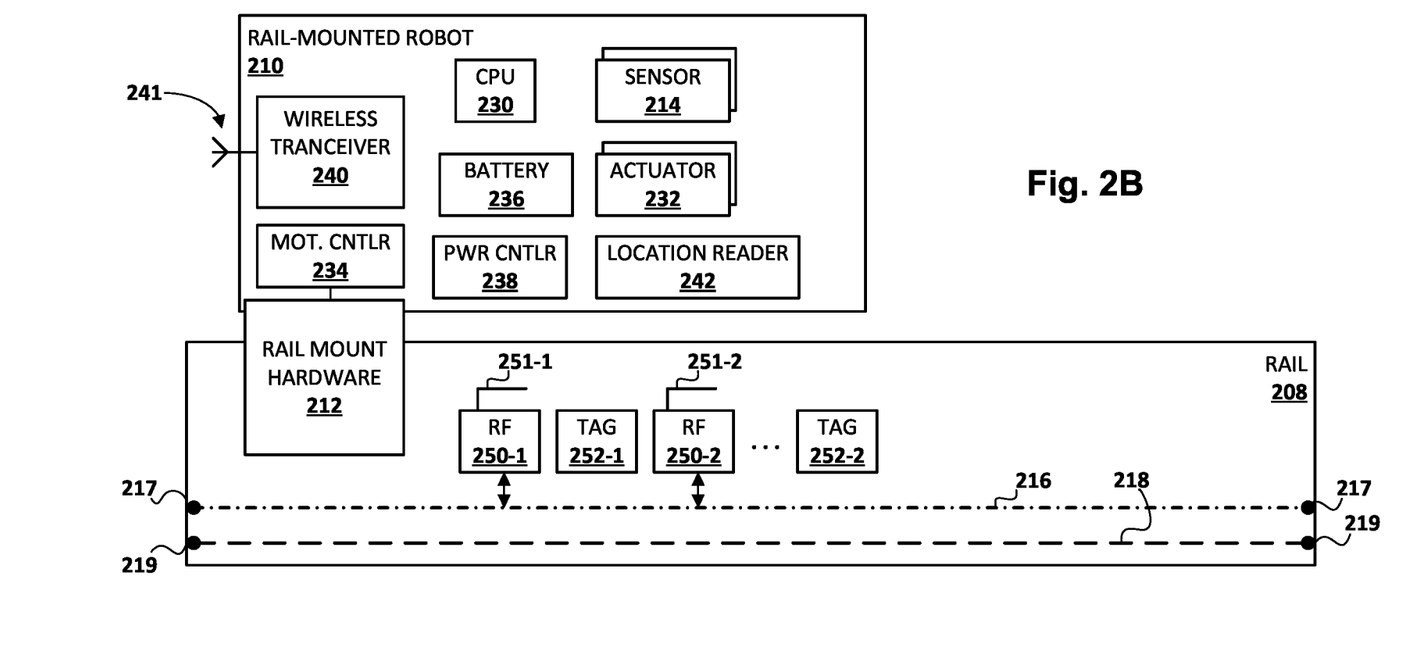

FIGS. 2A and 2B schematically depict example components of a modular rail section 208 and rail-mounted robot 210. Many of the components depicted in FIGS. 2A and 2B are similar to those depicted in FIG. 1, and therefore are indicated with similar reference numerals. In FIG. 2A, modular rail section 208 includes an embedded power line 216 and wireless transceiver 218, neither of which is exposed to the exterior of modular rail section 208. Consequently, neither component poses a risk of ignition in an explosion proof area.

In FIGS. 2A-B, as well as with other implementations described herein, modular rail section 208 may be a "modular" component, such that multiple such modular rail sections 208 may be assembled end-to-end to form a longer rail. To this end, embedded power line 116 includes, at one or both ends of the modular rail section 208, a power line terminal 217 that can be connected (e.g., galvanically) with a corresponding power line terminal of another modular rail section (not depicted in FIG. 2A). Likewise, embedded wireless transceiver 118 includes, at one or both ends of modular rail section 208, a wireless transceiver terminal 219 that can be connected (e.g., via coaxial connection, Ethernet connection, universal serial bus (USB) connection, etc.) with a corresponding wireless transceiver terminal of another modular rail section (not depicted in FIG. 2A).

As noted previously, power line 116 is embedded within modular rail section 208, and therefore is unexposed to an exterior of modular rail section 208. In order for power line 216 to provide power for charging a battery 236 (see FIG. 2B) of rail-mounted robot 210, a plurality of radio frequency (RF) power transmitters 250 are embedded (as indicted by the dashed lines) along a length of the rail. Each RF power transmitter 250 may provide power wirelessly to battery 236 of rail-mounted robot 210, e.g., by way of a power controller 238 (which may take the form of, for instance, an RF power receiver). For the sake of simplicity and brevity, three of these RF power transmitters 250-1, 250-3, and 250-7 are labeled in FIG. 2A. However, it should be understood that modular rail section 208 may include any number of RF power transmitters 250 distributed along its length.

Referring to FIG. 2B, rail-mounted robot 210 also includes a number of other components, such as one or more sensors 214, one or more processors 230 ("CPU" in FIG. 2B), one or more actuators 232, a motion controller 234 operably coupled with rail-mount hardware 212, the aforementioned battery 236 and power controller 238, a wireless transceiver 240 with one or more antenna 241, and a location reader 242. Wireless transceiver 240 of rail-mounted robot 210 may be configured to exchange data wirelessly with components such as server(s) 102 via embedded wireless transceiver 118 and process automation network(s) 106.

Processor(s) 230 may be configured to execute instructions in memory (not depicted) that cause processor(s) to perform various aspects of the present disclosure related to operation of rail-mounted robot 210. For example, processor(s) 230 may execute instructions that retrieve sensor data captured by one or more sensors 214 (e.g., vision sensor 114 in FIG. 1), perform various operations on the sensor data, and/or provide the sensor data back to server(s) 102. In some implementations, processor(s) 230 also may operate motion controller 234 to propel rail-mounted robot 210 along modular rail section 208, and/or to operate one or more actuators 232 to perform various tasks in environment 100. Actuators may include, for instance, grippers, drills, sprayers, joints (e.g., of robot arms affixed to rail-mounted robot 210), fire extinguishers, hoses, and so forth. In other implementations, in addition to or instead of processor(s) 230, rail-mounted robot 210 may include other types of logic, such as an application-specific integrated circuit (ASIC) or field-programmable gate array (FPGA).

Power controller 238 may receive power wirelessly from embedded power line 216 via RF power transmitters 250. As shown in FIG. 2B, each RF power transmitter 250 may include an RF power transmission antenna 251. Power controller 238 may include its own antenna (not depicted) that is adapted to receive power from RF power transmission antenna 251 of RF power transmitters 250. By allowing for wireless charging in any area of a plant, it is possible to reduce the size of battery 236, decreasing costs, complexity, etc.

As mentioned previously, conventional rail-mounted robots may localize using techniques such as IMUs, GPS, etc. However, these techniques may suffer from various shortcomings, especially in areas such as process automation facilities where there may be numerous sources of interference, noise, etc. Accordingly, rail-mounted robot 210 may include location reader 242 that is configured to read location indicia 252-1, 252-2, 252-3, 252-4, . . . distributed along the length of modular rail section 208. Location indicia 252 may take various forms. In some implementations, location indicia 252 may take the form of RFID or NFC tags that are configured to transmit location information (e.g., coordinates on a map) in response to being activated by an RF signal, e.g., provided by location reader 242. In other implementations, location indicia may be incorporated into RF power transmitters 250. For example, RF power transmitters 250 may modulate location data into the power they deliver to rail-mounted robot 210 (in which case location reader 242 and power controller 238 may be combined). In yet other implementations, location indicia may take the form of optically-readable indicia such as QR codes.

Figure 3A:
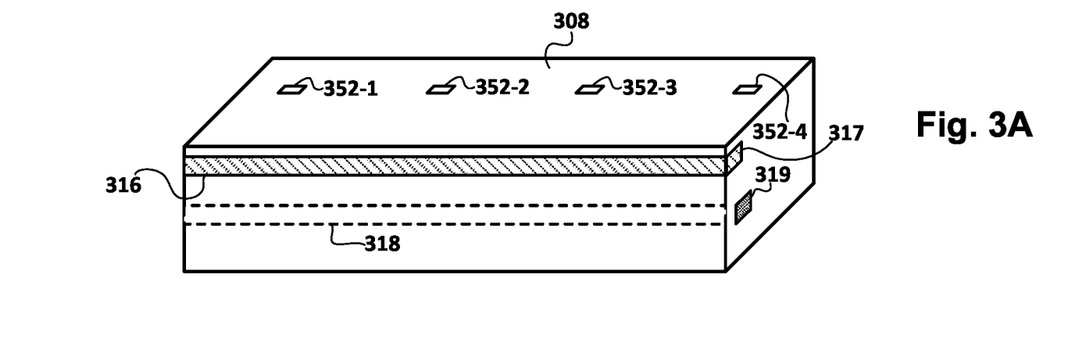
FIG. 3A and FIG. 3B schematically depict another example of a rail-mounted robot and rail, in accordance with various embodiments.
Figure 3B:
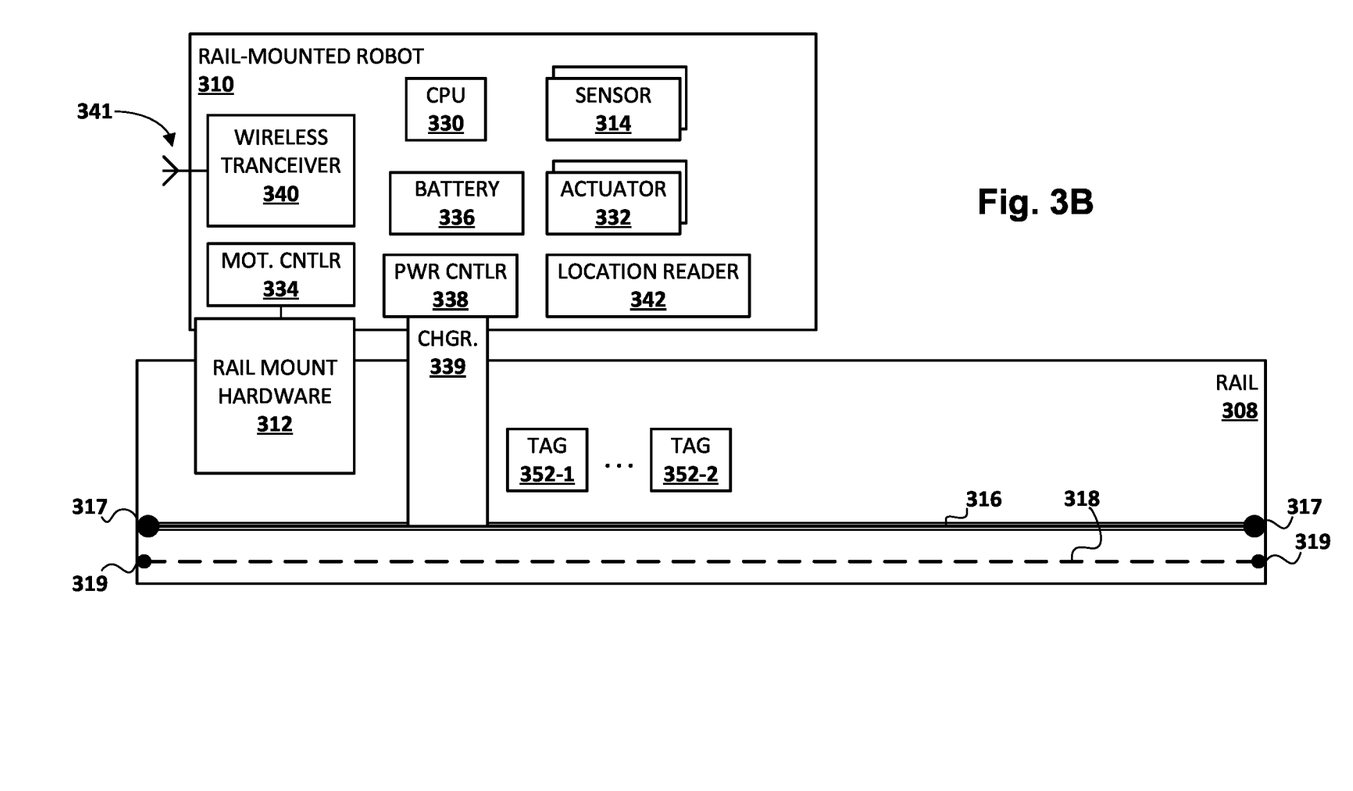

The embodiment depicted in FIGS. 3A and 3B is similar in many ways to that depicted in FIGS. 2A and 2B; accordingly, similar reference numerals are used. However, FIGS. 3A-3B depict an alternative way for charging a battery 336 of rail-mounted robot 310. Referring to FIG. 3A, modular rail section 308 includes many of the same components as modular rail section 208 of FIG. 2A. However, modular rail section 308 lacks wireless charging units. Instead, power line 316 is exposed as a conductive trace formed along an exterior length of modular rail section 308.

Because power line 316 is exposed, modular rail section 308 may not necessarily be deployed in hazardous areas. Instead, modular rail section 308 may be deployed in other, less hazardous areas, allowing rail-mounted robot 310 to charge while it travels through these areas. A benefit of having at least a portion of power line 316 exposed as a conductive trace, however, is that it may be possible to charge battery 336 of rail-mounted robot more quickly and/or efficiently than via wireless charging (e.g., shown in FIGS. 2A-B). For example, in FIG. 3B, power controller 338 includes a charger 339 that can position various types of electric contacts so that they contact (or at least come sufficiently close to) exposed power line 316, in many cases allowing for galvanic charging. Charger 339 may take various forms, such as a conductive wheel, capacitive coupling pad, or other similar terminal that draws power from the conductive trace formed by power line 316.

Because modular rail section 308 cannot be deployed in explosion-proof areas, when it is necessary to pass a rail through explosion-proof areas, other types of modular rail sections that are configured for safe operation in explosion-proof areas may be coupled with modular rail section 308. For example, in some implementations, a modular rail section in which power line 316 is completely embedded may eliminate a risk that an arc may ignite ambient materials. In some cases, a modular rail section where power line 316 is completely embedded and provides no power to rail-mounted robot 310 may be deployed. In such a case, rail-mounted robot 310 may simply operate on battery power while passing through the explosion-proof area.

Figure 4:
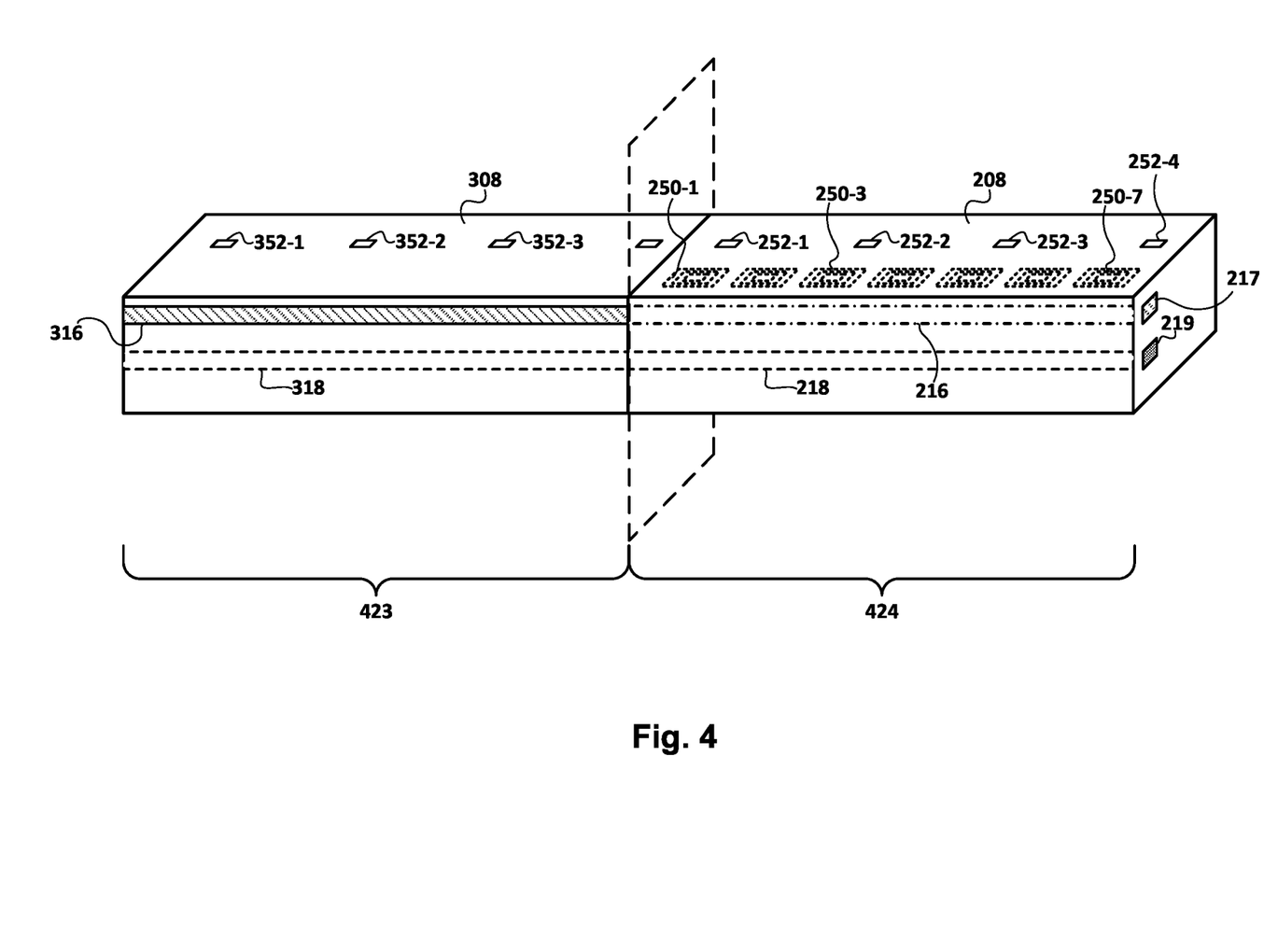
FIG. 4 depicts an example of how modular rail portions may be deployed across a boundary into an explosion-proof area, in accordance with various implementations.

However, in other implementations, a combination of the modular rail sections depicted in FIGS. 2A-B and 3A-B may be deployed. An example of such a configuration is depicted in FIG. 4. In FIG. 4, a first area 423 is not deemed hazardous, while a second area 424 is deemed an explosion-proof area. Accordingly, in first area 423 where it is safe to do so, modular rail section 308 from FIGS. 3A-B is deployed. When rail-mounted robot 310 (or 210) passes over modular rail section 308, it may charge by contacting charger 339 with power line 316, which as noted previously may be exposed to an exterior of modular rail section 308 as a conductive trace.

In explosion-proof area 424, on the other hand, modular rail section 208 from FIGS. 2A-B may be deployed. For instance, a power line terminal 217 of modular rail section 208 may be operably coupled with (e.g., electrical contact, male/female connection, etc.) a corresponding power line terminal 317 (see FIGS. 3A-B) of modular rail section 308. Likewise, a wireless transceiver terminal 219 of modular rail section 208 may be operably coupled with a wireless transceiver terminal 319 (see FIGS. 3A-B) of modular rail section 308. Consequently, rail-mounted robot 210/310 may charge its battery in both first area 423 and explosion-proof second area 424.

As noted previously, in some implementations where power terminals (wireless or conductive traces) are not evenly distributed along the rail, a rail-mounted robot may travel at different velocities depending on various factors, such as power terminals currently available to the robot, the robot's current battery level, a distance to the next available power terminal(s), time constraints associated with task(s) assigned to the robot, and so forth. Accordingly, a rail-mounted robot with relatively low battery may travel slower through first area 423 (assuming the exposed power line 316 is able to recharge the battery more quickly than wireless charging) that it does through second area 424. Additionally, within second area 424, the rail-mounted robot may travel more slowly across areas with more densely-distributed RF power transmitters 250.

Figure 5:
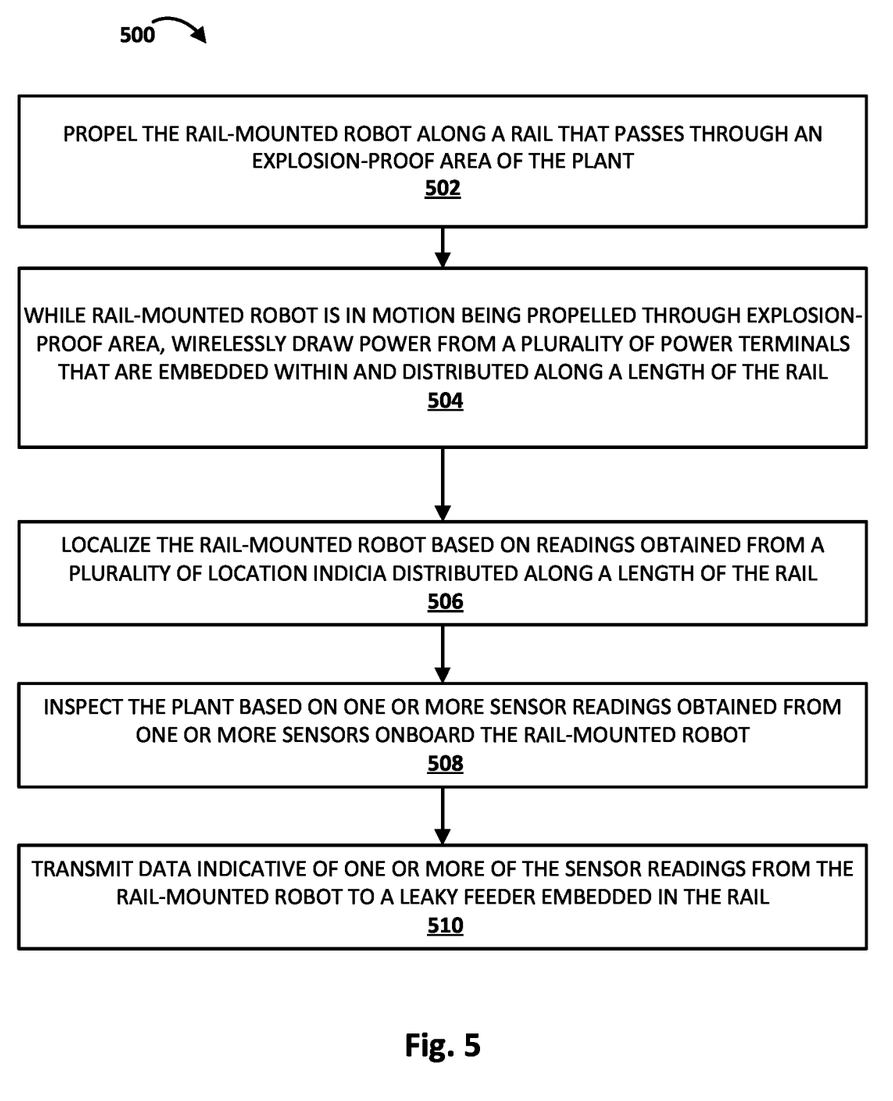
FIG. 5 illustrates an example method for performing selected aspects of the present disclosure.

FIG. 5 is a flowchart illustrating an example method 500 for operating a rail-mounted robot (e.g., 110, 210, 310), in accordance with implementations disclosed herein. For convenience, the operations of the flow chart are described with reference to a system that performs the operations. This system may include various components of various computer systems, such as processors 230/330 of rail-mounted robots 210, 310. Moreover, while operations of method 500 are shown in a particular order, this is not meant to be limiting. One or more operations may be reordered, omitted or added.

At block 502, the system, e.g., by way of motion controller 234, 334, may propel a rail-mounted robot (e.g., 110, 210, 310) along a rail (e.g., 108, 208, 308) that passes through an explosion-proof area (e.g., 124, 424) of a plant. For example, in response to command(s) received from server(s) 102 (or from human controllers, or as part of a scheduled routine) via process automation network 106, the processor(s) 230, 330 of rail-mounted robot 110, 210, 310 may instruct motion controller 234, 334 to operate an electric motor, propelling the rail-mounted robot along the rail.

While the rail-mounted robot is in motion being propelled through the explosion-proof area, at block 504, the system, e.g., by way of power controller 238, 338, may wirelessly draw power from a plurality of power terminals (e.g., 250-1, 250-2, ...) that are embedded within and distributed along a length of the rail.

At block 506, the system may localize the rail-mounted robot based on readings obtained from a plurality of location indicia distributed along a length of the rail. In some implementation, the power provided by the RF power terminals may also be modulated to carry location information, which the rail-mounted robot can use for purposes of localization. In other implementations, the rail-mounted robot may perform localization using location information read from RFID/NFC tags that are distributed along a length of the rail.

At block 508, the plant may be inspected based on one or more sensor readings obtained from one or more sensors onboard the rail-mounted robot. For example, vision sensor 114 can be used to capture images of sensors, gauges, or dials. These images may be analyzed, e.g., using artificial intelligence techniques such as trained CNNs, to detect these readings.

At block 510, the rail mounted robot may transmit data indicative of one or more of the sensor readings from the rail-mounted robot to a leaky feeder (e.g., 118, 218, 318) embedded in the rail. In some such implementations, the images may be analyzed onboard the rail-mounted robot, and the results of the analysis may be provided to server(s). In other implementations, raw image data or reduced-dimensionality embeddings generated therefrom may be transmitted by the rail-mounted robot to server(s) via the leaky feeder embedded in the rail.

What is claimed is:

1. A rail-mounted robot for inspecting a plant with an explosion-proof area, the rail-mounted robot comprising:
   an actuator to propel the rail-mounted robot along a rail;
   a battery to provide power to the actuator;
   a charger to draw power from a power terminal integral with the rail while the rail-mounted robot is in motion, and to charge the battery using the drawn power; and
   one or more processors configured to localize the rail-mounted robot based on readings from location indicia distributed along the rail;
   wherein the charger comprises a conductive wheel or capacitive coupling pad that draws power from an exposed conductive trace that extends along a length of the rail outside of the explosion-proof area.

2. The rail-mounted robot of claim 1, wherein at least some of the location indicia comprise radio frequency identification (RFID) tags, and the rail-mounted robot further comprises an RFID reader that obtains at least some of the readings used by one or more of the processors to localize the rail-mounted robot from the RFID tags.

3. A rail-mounted robot for inspecting a plant with an explosion-proof area, the rail-mounted robot comprising:
   an actuator to propel the rail-mounted robot along a rail;
   a battery to provide power to the actuator;

a charger to draw power from a power terminal integral with the rail while the rail-mounted robot is in motion, and to charge the battery using the drawn power;
one or more sensors and a transceiver to wirelessly transmit data obtained via one or more of the sensors to a remote computing device and
one or more processors to localize the rail-mounted robot based on readings from location indicia distributed along the rail;
wherein the transceiver is configured to exchange data wirelessly with a wireless antenna embedded within, and along a length of, the rail.

4. The rail-mounted robot of claim 3, wherein the wireless antenna comprises a leaky feeder antenna.

5. A rail-mounted robot for inspecting a plant with an explosion-proof area, the rail-mounted robot comprising:
an actuator to propel the rail-mounted robot along a rail;
a battery to provide power to the actuator;
a charger to draw power from a power terminal integral with the rail while the rail-mounted robot is in motion, and to charge the battery using the drawn power; and
one or more processors to localize the rail-mounted robot based on readings from location indicia distributed along the rail;
wherein the charger comprises a radio frequency (RF) power antenna, and the power terminal integral with the rail comprises a plurality of RF power transmitters distributed along a length of the rail, whereby the RF power antenna draws power from the plurality of RF power transmitters, and charges the battery using the drawn power.

6. The rail-mounted robot of claim 5, wherein at least some of the readings used by one or more of the processors to localize the rail-mounted robot are obtained intermittently from one or more of the plurality of RF power transmitters.

7. A rail-mounted robot for inspecting a plant with an explosion-proof area, the rail-mounted robot comprising:
an actuator to propel the rail-mounted robot along a rail;
a battery to provide power to the actuator;
a charger to draw power from a power terminal integral with the rail while the rail-mounted robot is in motion, and to charge the battery using the drawn power; and
logic to localize the rail-mounted robot based on readings from location indicia distributed along the rail;
wherein the actuator is configured to propel the rail-mounted robot at a first velocity over a first portion of the rail that includes the power terminal, and at a second velocity over a second portion of the rail that does not include the power terminal, and wherein the first velocity is less than the second velocity.

8. A system for inspecting a plant, comprising:
a rail that passes through an explosion-proof area of the plant, wherein the rail comprises one or more radio frequency (RF) power transmitters enclosed within a portion of the rail that passes through the explosion-proof area; and
a rail-mounted robot comprising:
an actuator to propel the rail-mounted robot along the rail;
one or more onboard sensors configured to generate one or more sensor signals that are usable to inspect the plant;
a battery to provide power to the actuator; and
a charger comprising an RF power antenna that charges to charge the battery with power drawn from one or more of the RF power transmitters while the rail-mounted robot is in motion.

9. The system of claim 8, wherein the rail includes a plurality of location indicia distributed along a length of the rail, and the rail-mounted robot includes one or more processors configured to localize the rail-mounted robot based on readings obtained from the location indicia.

10. The system of claim 9, wherein the plurality of indicia comprise at least some of the plurality of wireless power transmitters, whereby at least some of the readings used by the one or more processors to localize the rail-mounted robot are obtained intermittently from one or more of the RF power transmitters.

11. The system of claim 9, wherein at least some of the location indicia comprise radio frequency identification (RFID) tags, and the rail-mounted robot further comprises an RFID reader that obtains at least some of the readings used by the one or more processors to localize the rail-mounted robot from the RFID tags.

12. The system of claim 8, wherein the rail further comprises a leaky feeder antenna, and the rail-mounted robot is configured to transmit data generated from one or more of the onboard sensors to the leaky feeder antenna.

13. A system for inspecting a plant, comprising:
a rail that passes through an explosion-proof area of the plant, wherein the rail comprises a plurality of wireless power transmitters enclosed within a portion of the rail that passes through the explosion-proof area; and
a rail-mounted robot comprising:
an actuator to propel the rail-mounted robot along the rail;
one or more onboard sensors configured to generate one or more sensor signals that are usable to inspect the plant;
a battery to provide power to the actuator; and
a charger to charge the battery with power drawn from one or more of the wireless power transmitters while the rail-mounted robot is in motion;
wherein the actuator is to propel the rail-mounted robot at a first velocity over a first portion of the rail that includes the plurality of wireless power transmitters, and at a second velocity over a second portion of the rail that does not include wireless power transmitters, and wherein the first velocity is less than the second velocity.

14. A method for operating a rail-mounted robot to inspect a plant, the method comprising:
propelling the rail-mounted robot along a rail that passes through an explosion-proof area of the plant;
while the rail-mounted robot is in motion being propelled through the explosion-proof area, wirelessly drawing power from a plurality of radio frequency (RF) power terminals that are embedded within and distributed along a length of the rail; and
inspecting the plant based on one or more sensor readings obtained from one or more sensors onboard the rail-mounted robot.

15. The method of claim 14, further comprising transmitting data indicative of one or more of the sensor readings from the rail-mounted robot to a leaky feeder antenna embedded in the rail.

16. The method of claim 14, further comprising localizing the rail-mounted robot based on readings obtained from a plurality of location indicia distributed along a length of the rail.

* * * * *